Patented June 23, 1953

2,643,238

UNITED STATES PATENT OFFICE 2,643,238

ADHESIVE AND COATING COMPOSITION FROM SYNTHETIC COPOLYMERS

Robert N. Crozier and Wilfred K. Wilson, Springfield, Mass., assignors to Shawinigan Resins Corporation, Springfield, Mass., a corporation of Massachusetts No Drawing. Application May 29, 1951, Serial No. 228,970

3 Claims. (Cl. 260—33.8)

This invention relates to a plastic composition, more particularly a composition which is soluble or dispersible in water. This composition is particularly useful as an adhesive.

The adhesives known to the art are many and varied. The art has advanced to such a degree that special compositions have been developed for most of the important applications. However, the outstanding success of adhesives based on thermoplastic and thermosetting resins has created some problems. The permanence and tenacity of resin adhesives has made the destruction of the bond most difficult if the bond is to be broken in salvage or other types of operations.

An object of this invention is to provide an adhesive which will lose its effectiveness under special conditions.

A further object is to provide a hot melt adhesive which will give a permanent flexible bond until it is treated with dilute alkali.

Another object is to provide an adhesive which can be dissolved or dispersed in dilute solutions of alkali metal or ammonium compounds.

These and other objects are attained by incorporating a plasticizer in a copolymer of a vinyl ester and a salt of a monoalkyl maleic acid ester.

The following examples illustrate this invention. Where parts are mentioned, they are parts by weight.

Example I

This example illustrates one process for producing the copolymer of a vinyl ester and a salt of the monoalkyl maleic acid ester. The process is also described and claimed in my copending application Serial No. 228,969 filed May 29, 1951. The following chemicals were charged into a jacketed polykettle fitted with a slow speed agitator:

50 parts of water
0.9 parts of benzoyl peroxide
46.7 parts of vinyl acetate monomer This mixture was heated to 65° C. and, as soon as the vinyl acetate started to polymerize, the reaction product of 3.3 parts of monoisobutyl maleate with 1.3 parts of concentrated ammonium hydroxide (58% NH4OH) was added slowly throughout the course of polymerization. All of the salt of the monoalkyl maleate and the vinyl acetate had polymerized at the end of 90 minutes.

The product was in the form of fine spherical beads of the copolymer which were separated from the polymerization medium in a centrifuge and then dried in air at about 60° C. for about three hours. A solution of 8.6 grams of the dried product in 100 cc. of benzene had a viscosity of 14.8 centipoises at 20° C.

One hundred parts of this product was plasticized by mixing with 60 parts of dibutyl phthalate. Heating the mixture to 160° C. facilitated the incorporation of the plasticizer in the resin. Upon cooling, a homogeneous mass was obtained. The product was fluid at from 110° C. to 175° C., at which temperature it could be coated on glass, metal, fabrics, paper, wood, etc. to obtain adhesive bonds having excellent flexibility, strength and age resistance. Along with these excellent properties the bond could be broken by immersing it in 0.075 N solution of ammonium hydroxide.

It has also been discovered that this new copolymer is not only soluble itself but that it will disperse many other resins and extenders which may be incorporated into the adhesive. This property is especially important because it is sometimes desirable to modify the properties of this adhesive with water-insoluble agents.

Chlorinated diphenyls impart many desirable properties to an adhesive made with this new copolymer. Chlorinated diphenyls impart weather resistance, increased adhesion and decreased burning rate. They are also good softeners for the vinyl ester-ammonium or alkali metal monoalkyl maleate. The following formulation, for example, shows excellent flexibility and adhesion to fabrics and paper:

Example II 60 parts of the copolymer produced in Example I
10 parts of dibutyl phthalate
4 parts of "Aroclor 1254" (a chlorinated diphenyl manufactured by Monsanto Chemical Co.)

The resin, plasticizer and chlorinated diphenyl were mixed together at 150° C. until homogeneous. A metal casting was dipped into the fluid, then removed and dried in air at ordinary temperatures.

The coating produced showed excellent water resistance and yet when treated with dilute solutions of alkali, it dispersed completely. Cotton cloth bonded with this adhesive can be treated with alkali and recovered in a clean usable condition.

When this plasticized copolymer is used as the adhesive base, it will disperse most of the additives employed to vary the characteristics of the hot melt. "Nevillac" and "Vinsol" also improve the properties of the hot melt for some applications. "Nevillac" is a brand name for a phenol-indene-coumarone resin and "Vinsol" is a pine resin which is the petroleum hydrocarbon-insoluble, aromatic hydrocarbon-soluble extracts from long-leaf yellow pine trees. When either or both of these resins are used in the composition they impart toughness at ordinary temperatures and lower the flow temperature of the hot melt thereby facilitating its application.

A typical formulation which includes one of these resins is:

Example III 30 parts of the resin made as in Example I
15 parts of "Nevillac-Soft" (an alcohol-soluble condensation product of phenols with unsaturates of the coumarone-indene type with a melting point between 65 and 75° C. manufactured by the Neville Company)
4 parts of "Aroclor 1242" (a chlorinated diphenyl having a Saybolt Universal viscosity of 50 to 53 at 54.4° C. and manufactured by Monsanto Chemical Company)
20 parts of dibutyl phthalate The components can be easily mixed at elevated temperatures to form a homogeneous mass.

Extenders and fillers may also be added to the composition to decrease the cost of the adhesive without substantially reducing the adhesion or bond strength. The copolymer will act as a dispersant for all of these extenders and modifiers.

The copolymer resin base which is used in this invention is prepared as shown in Example I. The maximum amount of the salt of the monoalkyl maleate which will combine with a vinyl ester is one mol for every mol of vinyl ester. The best adhesives are made with copolymers containing between about 0.25 to 1.0 mol of the monoalkyl maleate salt to about 10 mols of the vinyl ester. Below this ratio, the dispersing action of the copolymer on the plasticizers, extenders and fillers is too slow. Above this ratio, the hot melt loses some of its adhesive powers and in the unneutralized or partially neutralized form, it is too water-sensitive for many applications.

Vinyl esters of aliphatic acids containing 2–6 carbon atoms are the preferred co-monomers. Examples of these esters are vinyl acetate, vinyl propionate, vinyl butyrate, vinyl valerate, vinyl hexoate and mixtures thereof. Copolymers containing vinyl acetate are especially valuable because the exceptional properties of polyvinyl acetate are partially transferred into the copolymer and the composition.

The monoalkyl ester of maleic acid may be prepared by any of the well known methods either from maleic acid or the anhydride. The alkyl group may be methyl, ethyl, propyl, isopropyl, butyl, isobutyl, tertiary butyl, amyl, hexyl, cyclohexyl, heptyl or any alkyl group containing between 1–15 carbon atoms, or mixtures thereof. The preferred alkyl groups contain 1–9 carbon atoms because they are more hydrophilic and do not significantly reduce the compatibility of the copolymer with extenders, plasticizers, etc. Unsaturated groups or reactive groups are not suitable because they react at the higher temperatures at which the hot melt is applied.

The remaining carboxyl group on the monoester is reacted with organic or inorganic basic reacting compounds. Examples of these are ammonium hydroxide, sodium hydroxide, potassium hydroxide, sodium bicarbonate, ethanolamine, diethanolamine and the like or mixtures of such compounds.

As pointed out in the examples, an amount of the basic reacting compound is used which is less than that required to neutralize the monoalkyl maleate. The resin most suitable in this adhesive composition contains a monoalkyl maleate which has been less than 50% neutralized with a basic compound. A resin containing an ammonium monoalkyl maleate as a co-monomer is preferred for many applications because it can be made more hydrophobic by heating the resin before or after it is compounded without diminishing the dispersibility of the hot melt in dilute alkaline solutions. For applications which do not require maximum water-insensitivity, the alkali metal monoalkyl maleate copolymers with vinyl esters are satisfactory. Again, however, less than 50% of the carboxyl groups should be neutralized with the alkali metal compound.

The amount of plasticizer in the composition may be varied to a considerable extent. The molecular weight of the copolymer, the degree of flexibility required and the temperatures at which the composition is to be applied are the major factors which govern the amount of plasticizer used. Taking these factors and others into consideration, generally between 5–150 parts of plasticizer are present for every 100 parts of the copolymer. In those compositions which contain other materials which have a plasticizing action on the copolymer, the amount of plasticizer may be reduced to compensate for the softening action of the other material.

Although the composition must contain a plasticizer for the copolymer, the type of plasticizer is not critical. It must be plasticized to make the composition sufficiently fluid for application at elevated temperatures. It must also be strong and flexible at ordinary temperatures. These partially contradictory properties may also be attained with plasticizers that are only completely compatible at higher temperatures. In general, the choice of plasticizer will depend upon the materials to be bonded. For example, if migration of the plasticizer into the materials to be bonded must be kept to a minimum, di-2-ethylhexyl phthalate, di-iso-octyl phthalate, di-N-octyl phthalate or tricresyl phosphate is usually chosen. For low temperature applications, adipic acid esters like di-butoxy ethyl adipate and di-iso-octyl adipate are preferred.

The phthalic acid esters are excellent general purpose plasticizers for the copolymers since all of the advantages of these adhesives can be achieved to a substantial degree with these esters. Optimum results can be obtained with the copolymer when it is plasticized with one or more of the following: diphenyl phthalate, diethyl phthalate, tricresyl phosphate, triphenyl phosphate, orthonitro biphenyl; adipic acid esters such as di-butoxy-ethyl adipate, di-iso-octyl adipate, di-2-ethylhexyl adipate; dibutoxyethyl phthalate, dimethoxyethyl phthalate, fatty phthalic acid esters, diethoxy-diglycol phthalate, and the like.

Other resinous substances which have a plasticizing or modifying action on the copolymer, may also be used in conjunction with one or more of the common plasticizers mentioned above. This group of resins includes both natural and synthetic materials and also encompasses within its scope materials commonly described as rosins and pitches. Examples of these resins are pinewood extracts like "Vinsol," rosin, rosin esters, phenolindene-coumarone resins like "Nevillac," and distillation products of sugar cane. These thermoplastic resins must be fluid at or below the temperature at which the composition is to be compounded or applied. In general, between 5 and 125 parts of the resin is used for every 100 parts of the copolymer. In Example III a typical formulation is disclosed in which "Nevillac" was used to increase the hardness of the hot melt at ordinary temperatures.

Chlorinated polyphenyls are another type of material that enhance the properties of the hot melt for some applications. They function in the composition as both a resin and a plasticizer. They impart increased adhesion, weather resistance and decrease the flammability of the adhesive. Chlorinated biphenyls are the preferred class of polyphenyls for this composition. They range in form from mobile oils to sticky resins and are easily incorporated into the hot melt adhesive. When these materials are used in the plasticized copolymer, the amount of plasticizer may usually be reduced slightly to compensate for the increase in mobility which is obtained from the use of polyphenyls. In general only relatively small amounts of these compounds are used in the composition. From 3 to 50 parts per 100 parts of the copolymer suffice to afford the composition all of the advantages to be gained from these chlorinated compounds. They are usually mixed into the plasticized copolymer at elevated temperatures to facilitate their dispersal.

Many different kinds of fillers are useful in this composition. Finely powdered mineral products such as limestone or slate flours, powdered silica, diatomaceous earth or clays may be used. For some purposes, fibrous fillers such as asbestos, mineral wool or glass wool or fibers are excellent. The main requirement is that the filler not decompose or char at the temperatures at which the composition is applied.

The main advantages obtained by the use of this composition over the use of conventional adhesives or coating compositions is that the materials coated with this composition can be salvaged and reused simply by treating with dilute alkali. This property is especially important in bonding paper. When this new composition is used, it can be removed by treating the magazines, books, etc., with dilute solutions of ammonium or alkali metal compounds. These advantages are obtained without sacrificing the tenacity of the adhesive bond.

The foregoing description is given in illustration and not in limitation of the invention as set forth in the appended claims.

We claim as our invention:

1. A composition comprising 100 parts of a copolymer of 10 mols of a vinyl ester of an aliphatic acid containing 2-6 carbon atoms and 0.25-1.0 mol of the reaction product of 2 mols of a monoalkyl ester of maleic acid with less than 1 mol of a basic reacting ammonium compound, 5-150 parts of a plasticizer for the copolymer and 3-50 parts of a chlorinated diphenyl.

2. A composition comprising 100 parts of a copolymer of 10 mols of vinyl acetate and 0.25-1.0 mol of the reaction product of 2 mols of a monoalkyl ester of maleic acid with less than one mol of a basic reacting ammonium compound, 5-150 parts of a plasticizer for the copolymer and 3-50 parts of a chlorinated biphenyl.

3. A composition comprising 100 parts of a copolymer of 10 mols of vinyl acetate and 0.25-1.0 mol of the reaction product of 2 mols of monoisobutyl maleate with less than one mol of ammonium hydroxide, 5-150 parts of a plasticizer for the copolymer and 3-50 parts of a chlorinated biphenyl.

ROBERT N. CROZIER.
WILFRED K. WILSON.

References Cited in the file of this patent

Schmidt et al.—"Principles of High-Polymer Theory and Practice," pages 82–86, McGraw Hill—New York, 1948.

"Plasticizers and Resins"—Monsanto Chemical Co., May, 1940, pages 32–34.